(12) United States Patent
Freese, V

(10) Patent No.: US 8,341,948 B2
(45) Date of Patent: Jan. 1, 2013

(54) APPARATUS AND METHOD FOR COOLING AN EXHAUST GAS

(75) Inventor: Charles E. Freese, V, Ira Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 832 days.

(21) Appl. No.: 12/369,820

(22) Filed: Feb. 12, 2009

(65) Prior Publication Data

US 2010/0000205 A1 Jan. 7, 2010

Related U.S. Application Data

(60) Provisional application No. 61/077,362, filed on Jul. 1, 2008.

(51) Int. Cl.
*F01N 3/00* (2006.01)

(52) U.S. Cl. ............ 60/298; 60/274; 60/289; 60/307; 60/317; 60/319; 60/320

(58) Field of Classification Search ............ 60/274, 60/287, 288, 289, 293, 298, 304, 307, 320, 60/324, 317, 318, 319
See application file for complete search history.

(56) References Cited

U.S. PATENT DOCUMENTS

| | | | | |
|---|---|---|---|---|
| 1,217,615 | A * | 2/1917 | McDowell | 181/262 |
| 3,143,293 | A * | 8/1964 | Purse | 239/397.5 |
| 3,857,458 | A * | 12/1974 | Ohtani et al. | 181/262 |
| 4,077,206 | A * | 3/1978 | Ayyagari | 60/262 |
| 6,237,395 | B1* | 5/2001 | Helgeson | 73/23.31 |
| 6,606,854 | B1* | 8/2003 | Siefker et al. | 60/262 |
| 6,833,116 | B2* | 12/2004 | D'Herde et al. | 422/176 |
| 7,757,482 | B2* | 7/2010 | Li et al. | 60/298 |
| 7,762,078 | B2* | 7/2010 | Lynch et al. | 60/771 |
| 7,793,495 | B2* | 9/2010 | Bradley et al. | 60/324 |
| 7,882,699 | B2* | 2/2011 | Cheng | 60/317 |

* cited by examiner

*Primary Examiner* — Binh Q Tran
(74) *Attorney, Agent, or Firm* — Cantor Colburn LLP

(57) ABSTRACT

An exhaust gas cooling apparatus and method for cooling an exhaust gas is provided. The exhaust cooling apparatus has a first fluid conduit and a variable nozzle extending from the first fluid conduit. The variable nozzle being disposed in an inlet end of a second fluid conduit, wherein the variable nozzle has at least two dissimilar materials adjacent to each other and a fluid inlet opening is located between an outer periphery of the variable nozzle and an inner surface of the inlet end of the second fluid conduit. The at least two dissimilar materials vary the size of an opening of the variable nozzle by moving toward or away from a center line of the first fluid conduit in response to a temperature of an exhaust gas flowing through the first fluid conduit.

18 Claims, 3 Drawing Sheets

APPARATUS AND METHOD FOR COOLING AN EXHAUST GAS

CROSS REFERENCE TO RELATED APPLICATION

This application claims the benefit of U.S. Patent Application Ser. No. 61/077,362, filed Jul. 1, 2008, the contents of which are incorporated herein by reference thereto.

FIELD OF THE INVENTION

Exemplary embodiments of the present invention are related to a fluid entrainment apparatus and, more specifically, to a fluid entrainment apparatus to cool an exhaust gas.

BACKGROUND

Manufacturers of vehicles that employ internal combustion engines, more particularly diesel engines, are striving to reduce and control exhaust emissions and comply with current and future emission standards for the release of oxides of nitrogen ($NO_x$), unburned and partially oxidized hydrocarbons (HC), carbon monoxide (CO), particulate matter, and other emissions, (i.e., hydrogen sulfide ($H_2S$) and ammonia ($NH_3$)). In order to reduce the previously mentioned emissions, diesel engines are typically operated with exhaust gas after-treatment systems.

Exhaust gas after-treatment systems typically include, but are not limited to, one or more after-treatment devices, such as oxidation catalysts, $NO_x$ abatement devices, diesel particulate filters (DPFs) and sulfur traps. These after-treatment devices generally require certain conditions to exist in the engine exhaust gas in order to perform optimally. For example, $NO_x$ abatement devices and oxidation catalysts, have a relatively narrow temperature window within which the devices activate, regenerate, or operate with high conversion efficiency. Some after-treatment devices require heating of the device to temperatures that are higher than those typically provided by the engine exhaust gases in order to achieve the desired operating temperature of the after-treatment device. One example of such a device is a diesel particulate filter (DPF).

Diesel particulate filters entrap particulates carried by a diesel engine exhaust flow, in operation, such diesel particulate filters accept exhaust flow at one end and trap particulates as exhaust gases diffuse through thin channel walls and exit out the other end. Continued particulate buildup in the diesel particulate filter is undesirable thus, it is necessary to clear the particulate buildup before the filter is obstructed.

Clearing of the particulate buildup is performed by a regeneration process wherein the temperature of the DPF is raised to a level sufficient to cause combustion and vaporization of the particulates captured by the DPF. Once the particulates are vaporized, the combustion products may be swept out of the filter by the exhaust stream.

In order to provide for localized heating to efficiently remove particulates from the filter the exhaust gas temperatures in the DPF must be increased. There are two primary regeneration events for a DPF: passive and active. During passive regeneration, exhaust gases reach sufficient temperatures to promote catalytic reactions that oxidize trapped soot. In active regeneration modes, the onboard engine control module forces the system to increase exhaust gas temperatures and/or regulate available oxygen content to either promote or halt a regeneration event. Regeneration events typically require exhaust temperatures between 570 and 650 degrees Celsius.

SUMMARY OF THE INVENTION

An exhaust gas cooling apparatus and method for cooling an exhaust gas is provided. The exhaust cooling apparatus has a first fluid conduit and a variable nozzle extending from the first fluid conduit. The variable nozzle being disposed in an inlet end of a second fluid conduit, wherein the variable nozzle has at least two dissimilar materials adjacent to each other and a fluid inlet opening is located between an outer periphery of the variable nozzle and an inner surface of the inlet end of the second fluid conduit. The dissimilar materials vary the size of an opening of the variable nozzle by moving toward or away from a center line of the first fluid conduit in response to a temperature of an exhaust gas flowing through the first fluid conduit.

In another embodiment, a method for cooling an exhaust gas of an exhaust treatment device of an engine is provided. The method comprising: directing an exhaust gas through a first fluid conduit having a variable nozzle defined by at least two dissimilar materials adjacent to each other and extending from the first fluid conduit. The variable nozzle is received in an inlet end of a second fluid conduit and the variable nozzle is disposed in the second fluid conduit proximate to the inlet end of the second fluid conduit such that a fluid inlet opening is defined between an outer periphery of the variable nozzle and an inner surface of the inlet end of the second fluid conduit. As such, a fluid is introduced into the second fluid conduit through the fluid inlet opening by varying the size of an opening of the variable nozzle, the fluid having a temperature lower than that of the exhaust gas and the fluid is mixed with the exhaust gas in the second fluid conduit to provide a mixed gas, the mixed gas having a temperature less than that of the exhaust gas. The opening of the variable nozzle is varied by moving the at least two dissimilar materials toward or away from a center line of the first fluid conduit in response to a temperature of the exhaust gas flowing through the first fluid conduit.

BRIEF DESCRIPTION OF THE DRAWINGS

Other features, advantages and details appear, by way of example only, in the following description of embodiments, the description referring to the drawings in which.

DESCRIPTION OF THE EMBODIMENTS

Figure 1:
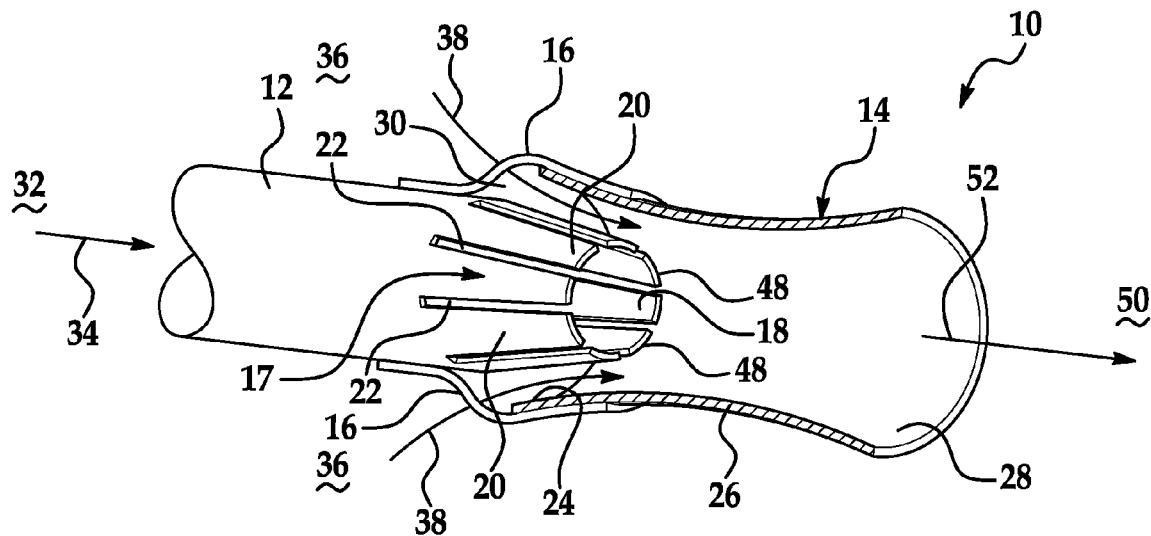
FIG. 1 is a partial cross-sectional view of an exhaust cooling device in accordance with an exemplary embodiment of the present invention.

Referring now to FIGS. 1-4, and in accordance with one non-limiting embodiment, an exhaust gas cooling apparatus 10 is illustrated. The exhaust gas cooling apparatus has a first fluid conduit 12 and a second fluid conduit 14. Although, the first and second fluid conduits are illustrated as having circular configurations and openings any cross-sectional shape for the first and second fluid flow conduits is contemplated as long as the desired results are achieved. Non-limiting examples of such configurations include oval, ellipse, square, rectangular and equivalents thereof.

The first fluid conduit is secured to the second fluid conduit by a plurality of securement members or stand offs 16. The stand offs are configured such that fluid can flow into the second fluid conduit from areas surrounding the first fluid conduit. The first fluid conduit is configured to receive an exhaust gas from an engine (not shown) and has a variable nozzle 17 with an opening 18 positioned to direct the exhaust gas into the second fluid conduit.

Figure 2:
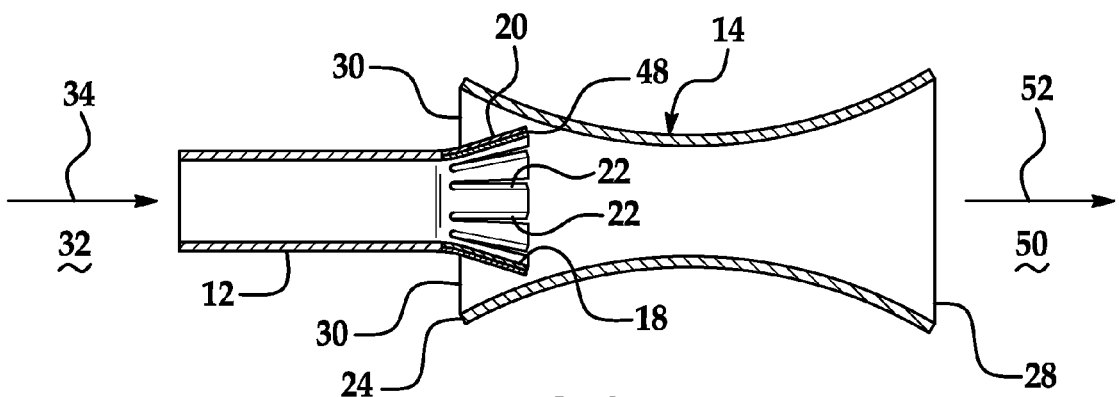
FIG. 2 is a cross-sectional view of the exhaust cooling device in a first operational position.

The variable nozzle of the first fluid conduit is capable of contracting and expanding at its distal end to provide both a smaller opening (FIGS. 1 and 3) and a larger opening (FIG. 2). Accordingly, the variable nozzle provides a variable nozzle opening. As will be discussed herein, the size of the variable nozzle opening is dependent upon the temperature of the exhaust gas flowing through the first fluid conduit and the nozzle. As the distal end of the nozzle contracts, a peripheral opening between an exterior surface of the nozzle and an inner surface of an inlet opening of the second fluid conduit is provided and/or enlarged. This inlet opening allows cooler gases (e.g., ambient air) to enter the exhaust gas cooling apparatus.

In the embodiment of FIGS. 1-4, the variable nozzle and its opening are defined by a plurality of tab members 20 extending from the first fluid conduit. The plurality of tab members are spaced apart from each other by a plurality of elongated openings or gaps 22 formed by any suitable manufacturing process. Accordingly, an array of tab members extending from the first fluid conduit defines the variable nozzle and its opening.

The variable nozzle extends from one end of the first fluid conduit and is located in an inlet end 24 of the second fluid conduit. The second fluid conduit has a central portion 26 disposed between the inlet end 24 and an outlet end 28 of the second fluid conduit. As shown, a cross-sectional area of the opening in the central portion 26 is smaller than the cross-sectional area of the opening at the inlet end 24 and the outlet end 28. Thus, the second fluid conduit resembles a venturi tube. The plurality of tabs are configured to vary the size of the nozzle opening which in turn varies an opening for cooler fluid or ambient air to enter into the second fluid conduit and provides a variable orifice into the second fluid conduit.

The outer diameter or periphery of the first fluid conduit is smaller than the periphery or diameter of the inlet end of the second fluid conduit such that a fluid inlet opening 30 is provided. When opening 30 is enlarged due to contraction of tabs 20 an exhaust gas 32 travels through the first fluid conduit in the direction of arrow 34 and ambient air 36 surrounding the first fluid conduit 12 is drawn in through the fluid inlet opening 30 in the direction of arrow 38. Thus, the size of the nozzle opening 18 and fluid inlet opening 30 is based upon the temperature of the exhaust gas flowing through the first fluid conduit and the nozzle and the size of the nozzle opening and the fluid inlet opening 30 varies accordingly.

Figure 1A:
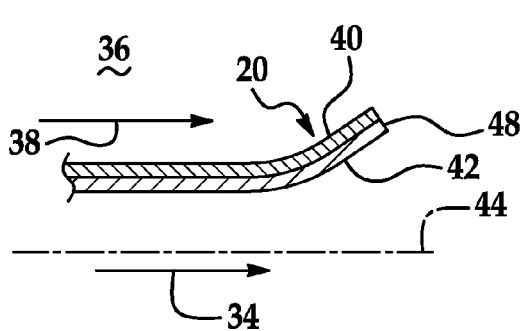
FIG. 1A is an enlarged cross-sectional view of a portion of the exhaust cooling device in a first position.
Figure 1B:
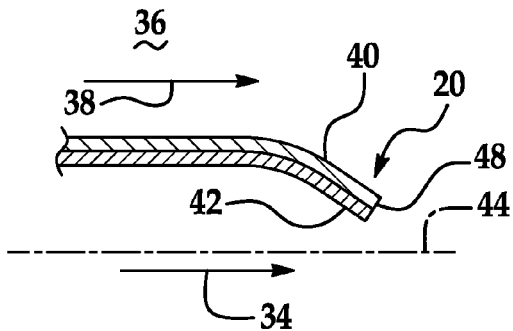
FIG. 1B is an enlarged cross-sectional view of a portion of the exhaust cooling device in a second position.

In order to vary the size of both the nozzle opening 18 and the fluid inlet opening 30, the plurality of tabs 18 are formed from a material or materials that will cause each of the plurality of tabs to transition between a first position (FIG. 1A) and a second position (FIG. 1B) as the temperature of the exhaust gas changes. See also FIGS. 2 and 3, which show the plurality of tabs in the first position and the second position.

The first position (FIG. 1A) corresponds to a cool exhaust gas (e.g., less than 550 degrees Celsius) flowing through the first fluid conduit 12 and the second position (FIG. 1B) corresponds to a hotter exhaust gas (e.g., greater than 570 degrees Celsius) flowing through the first fluid conduit 12. It is, of course, understood that temperatures greater or less than the aforementioned temperatures are contemplated. The second position decreases the size of the nozzle opening 18 which in turn increases the velocity of the exhaust gas traveling through the nozzle opening causing an increased amount of ambient air (non-exhaust gas) to be drawn into the second fluid conduit 14 through the fluid inlet opening 30.

In order to achieve this movement of tabs 20 to vary opening 18, each of the plurality of tabs are formed from a bimetallic material comprising a first material (e.g., metal or metal alloy) 40 and a second material (e.g., metal or metal alloy) 42 bonded or formed adjacent to the first material such that the two materials form the tab portion. The first material has a higher thermal expansion coefficient than the second material such that as the temperature of the exhaust gas increases, the first material will cause each of the plurality of tabs to deflect toward a center line 44 of the first fluid conduit wherein such movement of the plurality of tabs decreases the size of the nozzle opening.

Each metal shall be selected, based upon its material properties, to achieve appropriate motion of the tabs, according to the temperature of the exhaust gas flow through the first fluid conduit 12. The material properties shall be selected such that metal 40 (outer metal) has a higher thermal expansion coefficient, relative to metal 42 (inner metal). The bimetallic material may be formed using any suitable process (e.g., two layers brazed or welded together, metal deposition processes, various rolling and cladding processes or any equivalents thereof) wherein metal layers of dissimilar material properties are positioned adjacent to each other, particularly processes which form a strong metallurgical bond between the first and second materials sufficient to maintain its integrity in the thermal cycling environment described herein.

Figure 4:
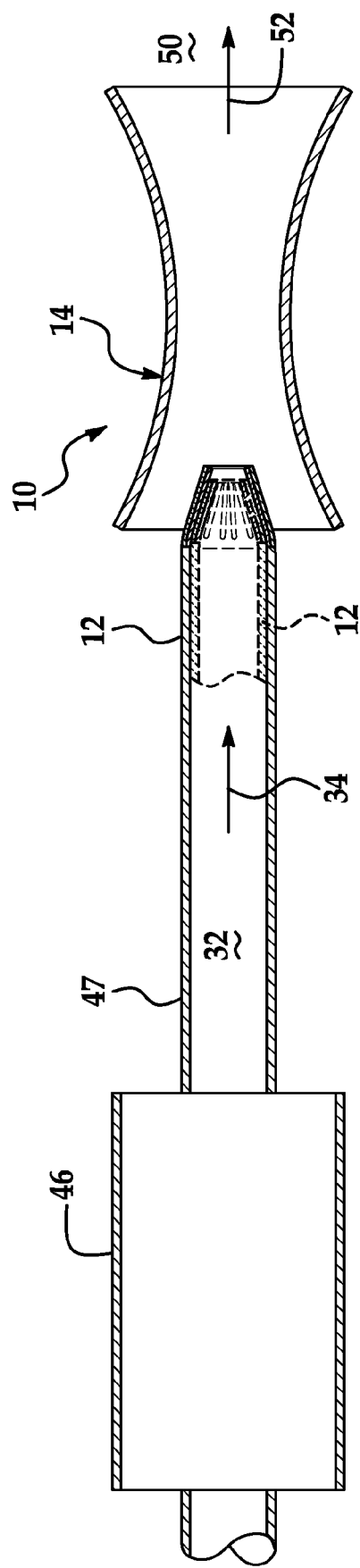
FIG. 4 is a schematic illustration of an exhaust system with an exhaust cooling device.

The first fluid conduit 12 is configured to receive exhaust gas from an exhaust gas treatment device 46, which in one embodiment is a diesel particulate filter (DPF). As is known in the related arts, a diesel particulate filter is an exhaust treatment device that requires heating beyond that which is typically provided by the exhaust gas to achieve a desired operating temperature in order to facilitate regeneration of the particulate filter. As shown in FIG. 4, the first inlet conduit is coupled to the outlet of the exhaust gas treatment device 46 via a conduit 47. Of course, first fluid conduit 12 may be directly coupled to the exhaust gas treatment device 46 or any other suitable means for providing fluid communication therebetween may be used for coupling the first fluid conduit to the exhaust gas treatment device.

When the temperature from the exhaust gas treatment device 46 increases and the ambient air (temperature and convection cooling from motion around the exhaust system) is insufficient to cool the exhaust gas flow through the nozzle, the outer metal 40 will expand at a faster rate than the inner metal 42 due to the bimetallic properties of tabs 20, causing the array of metal tabs to deflect inward thereby reducing the diameter of the nozzle 17. This will promote a more effective venturi effect through second conduit 14 by accelerating the exhaust gas flow into the central portion 26 through the nozzle and increasing the space for ambient air to enter the venturi device. Thus, hot exhaust gas is diluted with cool ambient air and the cooling effect is achieved. Accordingly, the exhaust gas cooling apparatus provides a variable orifice venturi as the nozzle opening 18 expands and contracts in response to the exhaust gas temperature to introduce cooling gases into an exhaust gas of an engine.

On the other hand and when the ambient temperatures are cooler and/or the vehicle is moving at a speed sufficient to cool the exhaust system (i.e. cooling air is moving across the tailpipe and exiting tailpipe gases are not concentrated on stationary devices) and/or the DPF is not in a regeneration mode (i.e. exhaust gases are cooler for example, less than 550 degrees Celsius), the nozzle orifice diameter will tend to increase thus reducing the back pressure on the system. The variable orifice diameter increase will be achieved by the greater contraction from the outer metal 40, relative to the inner metal 42 and hence the effectiveness of the venturi is reduced and engine backpressure is reduced. For a compression ignition (lean burn) engine in a moving vehicle, this effect can reduce backpressure under a wide range of operating conditions, namely when exhaust gas cooling is not required. This reduced restriction will improve fuel efficiency and will permit the engine to achieve higher power/torque without exceeding various engine component operating temperature limits.

FIG. 2 illustrates when the exhaust gas being received by the first fluid conduit is not hot enough to induce additional mixing of the cooler ambient air through the inlet opening between the first fluid conduit and the second fluid conduit although, as illustrated, elongated openings or gaps 22 will allow some cooler ambient air to be mixed with the exhaust gas in the second fluid conduit however, the lower velocity of the larger nozzle opening will reduce the amount of ambient air drawn into the second fluid conduit. Also, the variable nozzle opening 18 defined by the distal ends 48 of the plurality of tabs 20 is enlarged, which also results in a reduced exhaust gas velocity as well as a reduced backpressure to exhaust treatment device 46 since the variable nozzle 18 opening is at its largest configuration.

Figure 3:
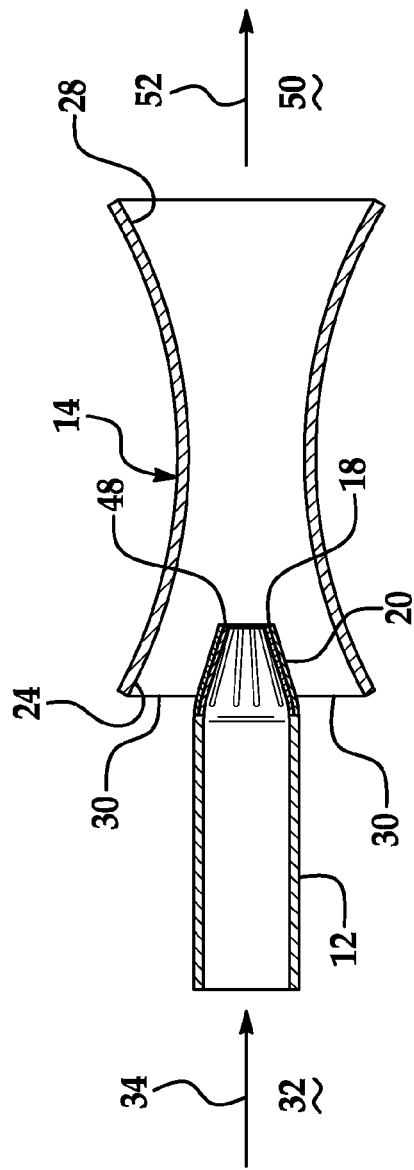
FIG. 3 is a cross-sectional view of the exhaust cooling device in a second operational position.

FIG. 3 illustrates that when the exhaust gas becomes hotter (e.g., due to regeneration of the diesel particulate filter of the exhaust system) the first material 40 having the higher thermal expansion coefficient will cause each of the plurality of tabs 20 to deflect toward the center line 44 of the first fluid conduit 12 and decrease the size of the nozzle opening 18 while simultaneously increasing the size of the inlet opening 30. As the plurality of tabs 20 are deflected toward the center line 44 of the first fluid conduit 12 the size of the nozzle opening 18 defined by a distal end 48 of each of the plurality of tab members is reduced and the velocity of the exhaust gas traveling though the nozzle opening 18 is increased and the venturi effect of the gases traveling through the second fluid conduit 14 causes cooler ambient air to be drawn into the inlet opening 30. Accordingly, the hot exhaust gas is diluted in the central portion of the second fluid 14 conduit with the cooler ambient air in order to provide a diluted or cooled exhaust gas 50 in the direction of arrow 52. The configuration of the exhaust cooling apparatus illustrated in FIG. 3 is desired during a regeneration event of the diesel particulate filter or exhaust treatment device 46, which results in hotter exhaust gases (e.g., greater than 570 degrees Celsius). During this event it is desirable to cool these exhaust gases by mixing the same with the ambient air surrounding the first fluid conduit 12.

In one non-limiting embodiment the tabs 20 contact the second fluid conduit 14 in the first position and substantially close the opening 30 between the outer periphery of the nozzle and the inner periphery of the inlet opening of the second fluid conduit 14. Alternatively, the tabs 20 do not contact the second fluid conduit in the first position however the opening 30 between the outer periphery of the first fluid conduit and the inner periphery of the second fluid conduit remains substantially closed (see for example FIG. 2).

In addition, the exact location of the variable nozzle 17 in the second fluid conduit 14 may vary as long as the desired mixing is achieved during certain exhaust conditions. Namely, the exhaust gas is mixed with the ambient air in the central portion 26 of the second fluid conduit 14 to provide a cooler mixed gas 50 that is exhausted through the outlet opening 28 of the second fluid conduit 14. For example, an outer periphery of the variable nozzle 17 is disposed in the inlet end 24 of the second fluid conduit 14 or an outer periphery of the first fluid conduit 12 is disposed in the inlet end 24 of the second fluid conduit 14.

Figure 5:
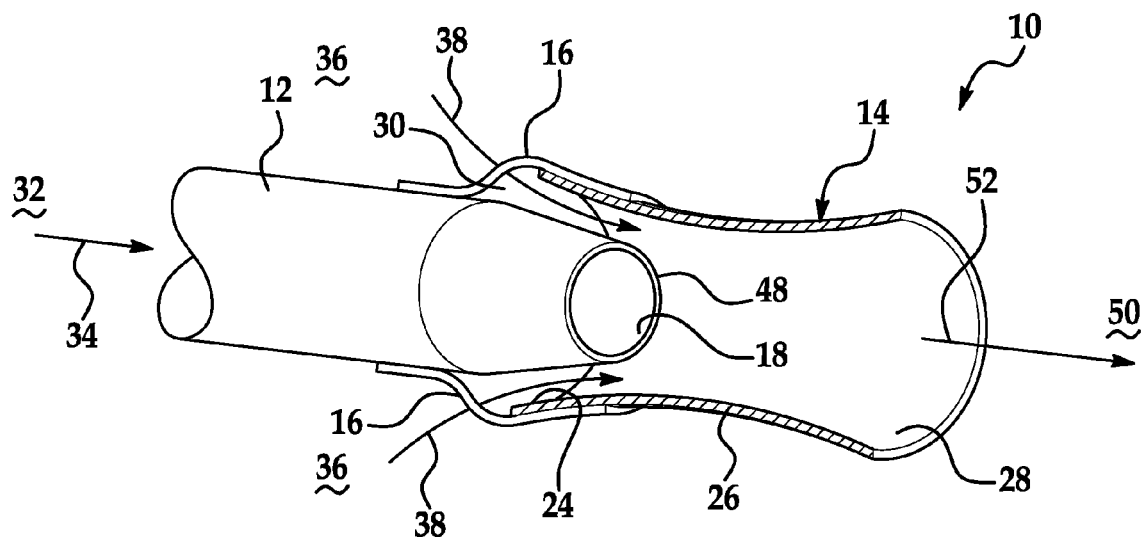
FIG. 5 is a partial cross-sectional view of an exhaust cooling device in accordance with an alternative embodiment.
Figure 5A:
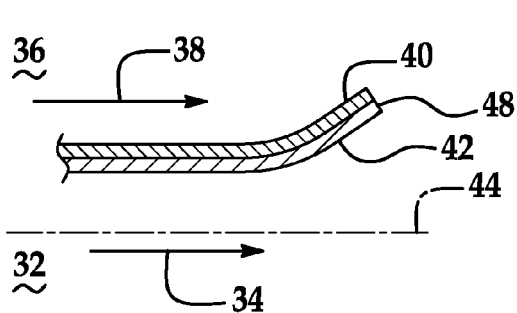
FIG. 5A is an enlarged cross-sectional view of a portion of the exhaust cooling device of FIG. 5 in a first position.
Figure 5B:
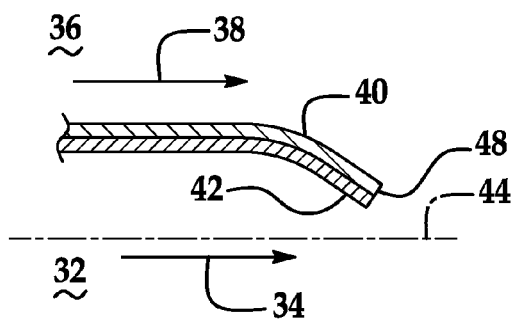
FIG. 5B is an enlarged cross-sectional view of a portion of the exhaust cooling device of FIG. 5 in a second position.

In an alternative embodiment and referring to FIGS. 5-5B, it is also possible to achieve the variable nozzle functionality without using the longitudinal tab members 20 in the upstream pipe. Here the nozzle 17 is secured to the end of the first fluid conduit 12 and the nozzle 17 is formed from the two dissimilar materials. Other contemplated embodiments include a unitary nozzle or nozzle formed from a plurality of tabs 20 each extending from a plurality of pipes (e.g., first fluid conduits) that are not of constant diameter such that at least one pipe or conduit can be inserted into another pipe or conduit and the distal ends of the plurality of tabs will be misaligned such that the ends of the plurality of tabs of the largest diameter pipe of the first fluid conduit will have their distal ends extending further outwardly from the distal ends of the tabs of the pipe or pipes inserted into it. In other words, a plurality of non-uniform pipes are inserted into each other wherein each pipe has a successively smaller diameter and each pipe or some of the pipes have a plurality of tabs with at least two materials of different thermal characteristics. This could permit overlapping tab designs that promote unique flow characteristics and could regulate turbulent mixing effects within the venturi. See for example the smaller inner pipe or conduit illustrated by the dashed lines in FIG. 4. Of course, the configuration of any of the aforementioned embodiments will vary according to application requirements. The exact exhaust/tab/pipe geometries, orientation, and material properties require optimized tuning for the specific operating ranges.

Figure 6:
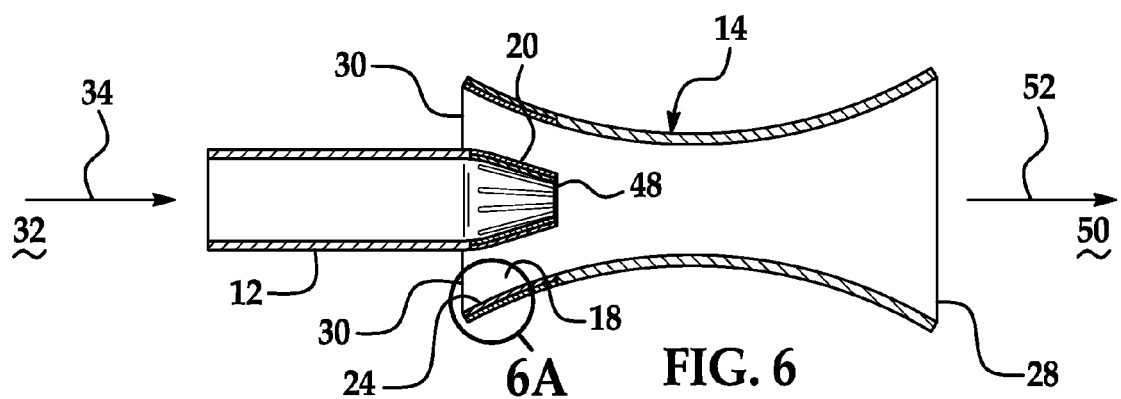
FIG. 6 is a partial cross-sectional view of an exhaust cooling device in accordance with still another alternative embodiment.
Figure 6A:
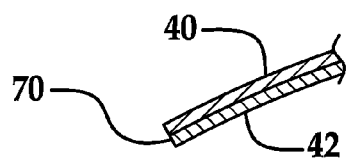
FIG. 6A is an enlarged cross-sectional view of a portion of the exhaust cooling device of FIG. 6 in a first position.

Referring to FIGS. 6 and 6A and in still another alternative embodiment, the bimetallic design strategy is applied to the outer pipe or second fluid conduit 14, in order to further augment the venturi effects under various operating conditions. Here, the inlet end 24 of the second fluid 14 is constructed of the two dissimilar materials. Similar to the previously described embodiments the inlet end includes a bimetallic material comprising a first material (e.g., metal or metal alloy) 40 and a second material (e.g., metal or metal alloy) 42 bonded or formed adjacent to the first material and the first material has a different (e.g., higher or lower) thermal expansion coefficient than the second material in order to provide the desired movement of a distal end 70 of the bi-metallic material.

In this embodiment, the two dissimilar materials may be disposed on both the first fluid conduit 12 and the second fluid conduit 14 or only the second fluid conduit 14. As illustrated in FIG. 6A, the distal end 70 of the bimetallic material comprising materials 40 and 42 will also move in response to the temperature of the fluids being drawn into the exhaust cooling apparatus and accordingly the size of the inlet opening 30 will vary as the distal end 70 moves.

Accordingly, methods for cooling an exhaust gas of an exhaust treatment device of an engine are provided. As discussed herein, the exhaust gas travels through a first fluid conduit having a variable nozzle with an opening defined by a plurality of tab members extending from the first fluid conduit. The nozzle opening is received in an inlet end of a second fluid conduit having a venturi tube configuration to define a fluid inlet opening between the nozzle and the second fluid conduit for ambient air to be drawn in and mixed with the exhaust gas in the second fluid conduit to provide a cooled diluted gas that exits the outlet end of the second fluid conduit. The method of cooling of the exhaust gas is often desired when there is an emission control device such as a diesel particulate filter, or DPF mounted upstream of the first fluid conduit.

As the higher temperature exhaust gas flows into the first fluid conduit and through the nozzle opening, the plurality of tabs will deflect toward the center line of the first fluid conduit and reduce the nozzle opening. The reduction in cross-sectional area of the nozzle opening causes the velocity of the exhaust gas exiting therefrom to increase. By accelerating the exhaust gas an increased amount of ambient air can enter the second fluid conduit through the inlet opening or opening defined by and located between the first fluid conduit and the second fluid conduit since the inlet opening(s) becomes larger due to the plurality of tabs or materials defining the nozzle opening deflecting toward the center line of the first fluid conduit.

Dissimilar material properties are selected to exploit differences in thermal expansion coefficients in order to provide smaller nozzle diameters when the exhaust gases are hot enough or above a predetermined temperature range to require exhaust gas cooling and ambient temperatures of the surrounding air is not sufficiently cool to significantly reduce the temperature of the exhaust gas and/or vehicle motion does not create enough ambient air motion around the exhaust cooling apparatus to cool the exhaust gases.

The cooling apparatus is tuned to optimize conditions where the system becomes active for exhaust gas cooling. Under other conditions where exhaust gas cooling is not required, the nozzle will increase its diameter and thus reduce the backpressure on the exhaust system. This variable orifice nozzle opening provides the following benefits since the system does not always have to have a smaller nozzle opening: improved fuel economy; increased performance (power/torque); and improved engine durability.

Moreover, the cooling apparatus provides a cost effective variable nozzle venturi exhaust cooler that does not require complex moving parts, actuators, and/or computer controlled algorithms since the variable openings are achieved without adding more complex active computer controlled valve devices that also necessitate complex OBD2 diagnostic routines that may also require additional sensors to monitor performance of the device.

Although one embodiment has been described with reference to the vehicular exhaust system, those skilled in the art will recognize that the exhaust cooling apparatus may be used in other applications involving both gaseous and liquid flows. Additionally, the exhaust cooling apparatus may be configured to be an exhaust heating apparatus wherein the first and second material of the plurality of tabs are configured to deflect inwardly when the exhaust gas is cooler than the ambient air thus drawing in a hotter ambient air to the cool exhaust gas.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas cooling apparatus, comprising:
a first fluid conduit;
a variable nozzle extending from the first fluid conduit, the variable nozzle further comprising at least two dissimilar materials adjacent to each other; and
a second fluid conduit having an inlet end and an outlet end, at least a portion of the variable nozzle being disposed in the second fluid conduit proximate to the inlet end of the second fluid conduit such that a fluid inlet opening is located between an outer periphery of the variable nozzle and an inner surface of the inlet end of the second fluid conduit, the at least two dissimilar materials vary the size of an opening of the variable nozzle by moving toward or away from a center line of the first fluid conduit in response to a temperature of an exhaust gas flowing through the first fluid conduit to mix the exhaust gas with a fluid surrounding a portion of the first fluid conduit proximate to the fluid inlet opening by drawing the fluid into the second fluid conduit, wherein the size of the opening of the variable nozzle decreases in response to the temperature of the exhaust gas increasing above a predetermined temperature.

2. The exhaust cooling apparatus as in claim 1, wherein the variable nozzle is defined by a plurality of tabs extending from the first fluid conduit and each of the plurality of tabs are separated from each other by a longitudinal opening and a distal end of each of the plurality of tabs define the opening of the variable nozzle.

3. The exhaust cooling apparatus as in claim 2, wherein each of the plurality of tabs are formed from the at least two dissimilar materials to form a bi-metallic material comprising a first material and a second material, the first material having a higher thermal expansion coefficient than the second material and as a temperature of the exhaust gas exceeds a predetermined temperature, the first material will cause each of the plurality of tabs to deflect toward the center line of the first fluid conduit wherein the plurality of tabs decrease the size of the opening of the variable nozzle.

4. The exhaust cooling apparatus as in claim 1, wherein the first fluid conduit is secured to the second fluid conduit by a plurality of stand offs.

5. The exhaust cooling apparatus as in claim 1, wherein the second fluid conduit further comprises a central portion disposed between the inlet end and the outlet end and the second fluid conduit has an opening extending therethough, the opening being larger at the inlet end and the outlet end than at the central portion to define a venturi.

6. The exhaust cooling apparatus as in claim 1, wherein the size of the fluid inlet opening increases when the opening of the variable nozzle decreases.

7. The exhaust cooling apparatus as in claim 1, wherein the first fluid conduit is configured for attachment to an exhaust pipe of a vehicle exhaust system and an exhaust backpressure in the first fluid conduit increases when the at least two dissimilar materials move toward the center line of the first fluid conduit and the exhaust backpressure in the first fluid conduit decreases when the at least two dissimilar materials move away from the center line of the first fluid conduit.

8. The exhaust cooling apparatus as in claim 1, wherein the inlet end of the second fluid conduit further comprises at least two dissimilar materials adjacent to each other, the at least two dissimilar materials vary the size of the fluid inlet opening by moving toward or away from a center line of the first fluid conduit in response to the temperature of the exhaust gas flowing through the first fluid conduit.

9. A method for cooling an exhaust gas of an engine, comprising:
   directing an exhaust gas through a first fluid conduit having a variable nozzle defined by at least two dissimilar materials adjacent to each other and extending from the first fluid conduit, the variable nozzle being received in an inlet end of a second fluid conduit, the variable nozzle being disposed in the second fluid conduit proximate to the inlet end of the second fluid conduit such that a fluid inlet opening is defined between an outer periphery of the variable nozzle and an inner surface of the inlet end of the second fluid conduit;
   introducing a fluid into the second fluid conduit through the fluid inlet opening, the fluid having a temperature lower than that of the exhaust gas;
   mixing the fluid with the exhaust gas in the second fluid conduit to provide a mixed gas, the mixed gas having a temperature less than that of the exhaust gas; and
   varying a size of an opening of the variable nozzle by moving the at least two dissimilar materials toward or away from a center line of the first fluid conduit in response to a temperature of the exhaust gas flowing through the first fluid conduit thereby increasing or decreasing the amount of fluid introduced into the second fluid conduit, wherein varying the size of the opening of the variable nozzle further comprises decreasing the size of the opening of the variable nozzle in response to the temperature of the exhaust gas increasing above a predetermined temperature.

10. The method as in claim 9, further comprising varying a size of the fluid inlet opening by moving the at least two dissimilar materials toward or away from the center line of the first fluid conduit in response to the temperature of the exhaust gas flowing through the first fluid conduit, wherein an exhaust backpressure in the first fluid conduit increases when the at least two dissimilar materials move toward the center line of the first fluid conduit and the exhaust backpressure in the first fluid conduit decreases when the at least two dissimilar materials move away from the center line of the first fluid conduit, the increased backpressure in the first fluid conduit increases a velocity of the exhaust gas through the opening of the variable nozzle thereby drawing the fluid into the second fluid conduit.

11. The method as in claim 9, wherein the first fluid conduit is secured to the second fluid conduit by a plurality of stand offs.

12. The method as in claim 9, wherein the second fluid conduit further comprises a central portion disposed between the inlet end and the outlet end and the second fluid conduit has an opening extending therethough, the opening being larger at the inlet end and the outlet end than at the central portion to define a venturi.

13. The method as in claim 9, wherein the opening of the variable nozzle is defined by a distal end of a plurality of tabs extending from the first fluid conduit, wherein each of the plurality of tabs are separated from each by a longitudinal opening.

14. The method as in claim 13, wherein each of the plurality of tabs are formed from the at least two dissimilar materials to form a bi-metallic material comprising a first material and a second material, the first material having a higher thermal expansion coefficient than the second material and as a temperature of the exhaust gas increases, the first material will cause each of the plurality of tabs to deflect toward a center line of the first fluid conduit wherein the plurality of tabs decrease the size of the nozzle opening.

15. The method as in claim 9, further comprising increasing a velocity of the exhaust gas flowing through the variable nozzle opening by decreasing a size of the opening by moving the at least two dissimilar materials toward the center line of the first fluid conduit, to draw the fluid into the second fluid conduit.

16. The method as in claim 15, further comprising increasing a size of the fluid inlet opening by moving the at least two dissimilar materials toward the center line of the first fluid conduit.

17. The method as in claim 9, wherein varying the size of the opening of the variable nozzle further comprises increasing the size of the opening the variable nozzle in response to the temperature of the exhaust gas decreasing below a predetermined temperature.

18. The exhaust cooling apparatus as in claim 1, wherein the size of the opening of the variable nozzle increases in response to the temperature of the exhaust gas decreasing below a predetermined temperature.

* * * * *